United States Patent [19]
Wallace et al.

[11] Patent Number: 5,810,272
[45] Date of Patent: Sep. 22, 1998

[54] SNAP-ON TUBE AND LOCKING COLLAR FOR GUIDING FILAMENTARY MATERIAL THROUGH A WALL PANEL OF A CONTAINER CONTAINING WOUND FILAMENTARY MATERIAL

[75] Inventors: Robert P. Wallace, Amawalk; Ronald E. Zajac, Junction, both of N.Y.

[73] Assignee: Widings, Inc., Patterson, N.Y.

[21] Appl. No.: 827,065

[22] Filed: Mar. 26, 1997

Related U.S. Application Data

[60] Provisional application Nos. 60/014,390 Mar. 28, 1996, 60/017,161 Apr. 10, 1996 and 60/019,716 Jun. 6, 1996.

[51] Int. Cl.$^6$ .......................... B65H 57/00; B65H 49/18; F16L 41/00
[52] U.S. Cl. .................................. 242/157 R; 242/137.1; 242/163; 242/171; 285/205; 403/329
[58] Field of Search ................................ 242/157 R, 171, 242/137.1, 163; 403/326, 329; 285/205, 209, 210

[56] References Cited

U.S. PATENT DOCUMENTS

| | | | |
|---|---|---|---|
| 2,459,747 | 1/1949 | Kolbe .................................. | 285/205 X |
| 3,643,987 | 2/1972 | Dupont ..................................... | 285/205 |
| 4,009,845 | 3/1977 | Santucci et al. .................. | 242/137.1 X |
| 4,019,636 | 4/1977 | Wise . | |
| 4,022,399 | 5/1977 | Zajac . | |
| 4,057,204 | 11/1977 | Zajac . | |
| 4,274,607 | 6/1981 | Priest . | |
| 4,373,687 | 2/1983 | Zicko . | |
| 5,042,739 | 8/1991 | Zajac . | |
| 5,150,852 | 9/1992 | Hunt et al. ........................... | 242/157 R |
| 5,368,245 | 11/1994 | Fore . | |
| 5,520,347 | 5/1996 | Bass et al. ........................... | 242/157 R |

*Primary Examiner*—Michael Mansen
*Attorney, Agent, or Firm*—Watson Cole Grindle Watson, PLLC.

[57] ABSTRACT

A payout tube assembly for unwinding filamentary material from a wound coil of filamentary material contained in a container having a wall panel with a hole for mounting a push-on tube and locking collar on the container wall panel, wherein a hollow payout tube having an end portion extends through the hole, the end portion including a flange extending around the periphery of the tube and having a surface engaging the inner surface of the wall panel surrounding the hole, and further including at least three segmented locking protrusions extending around the periphery of the end portion and separated by spaces; a locking collar for engaging the outer wall of the wall panel and including at least three segmented locking teeth equally spaced substantially around an inner perimeter of the locking collar for engaging with the segmented locking protrusions with pressure exerted on the locking collar to cause the payout tube and the locking collar to be locked together by increased locking forces produced by the three non-opposed locking teeth. The plurality of segmented flexible fingers may be greater than the plurality of segmented locking protrusions to provide additional locking forces between the locking collar and the payout tube. The locking collar may also include at least three segmented locking teeth spaced around an inner perimeter of the second flange for engaging with the segmented locking protrusions with pressure exerted on the locking collar to increase the locking forces produced by the at least three locking teeth.

17 Claims, 4 Drawing Sheets

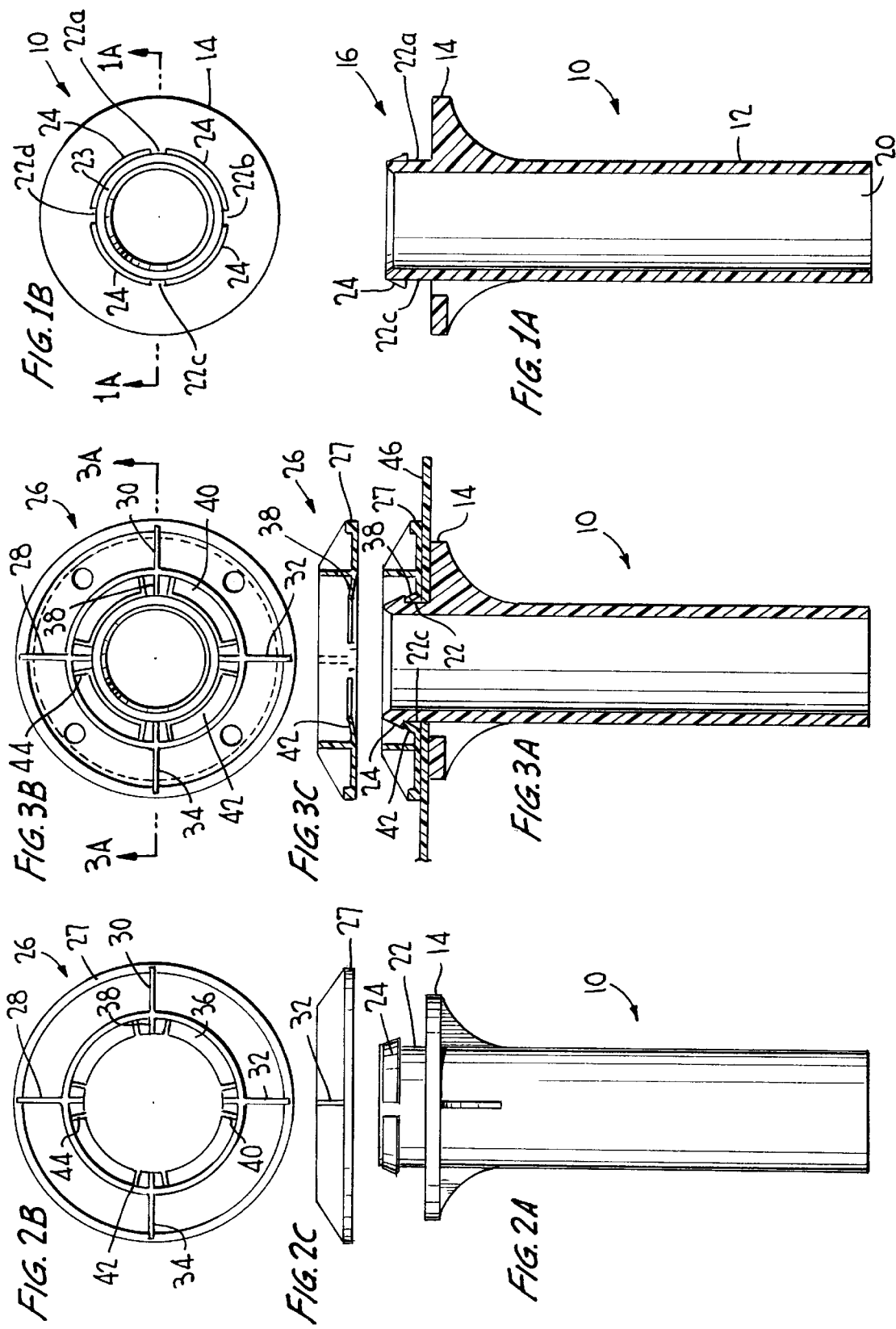

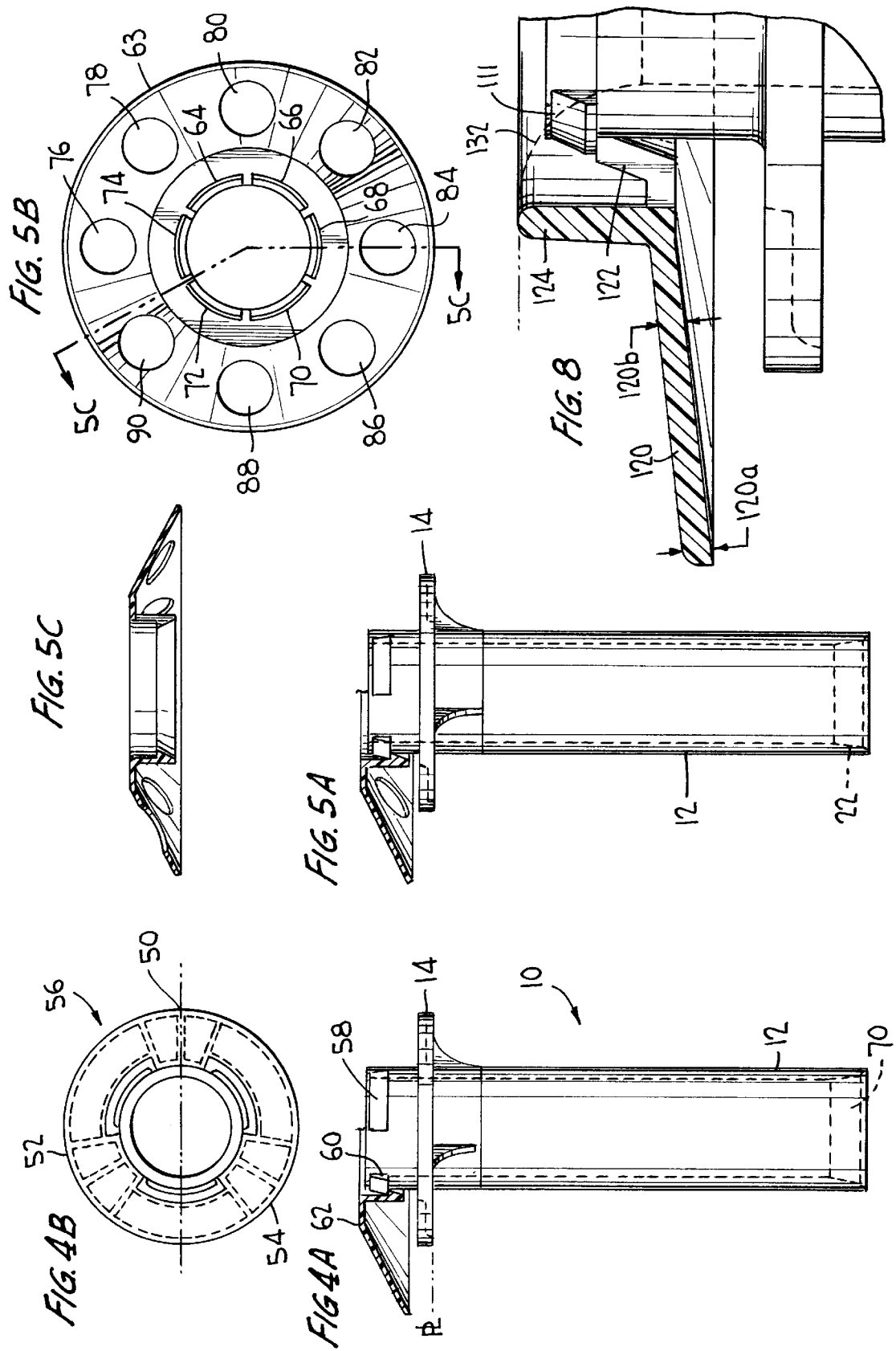

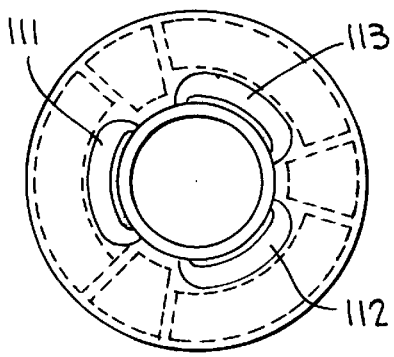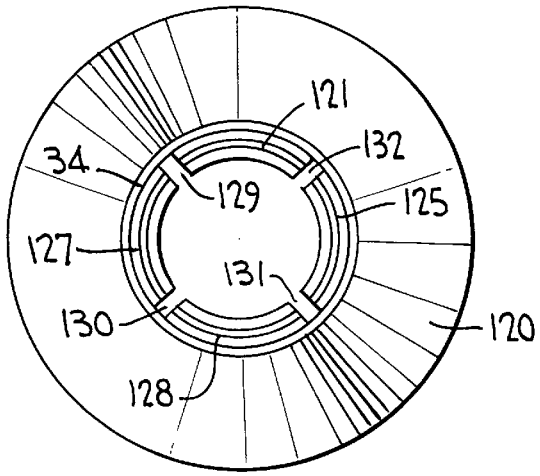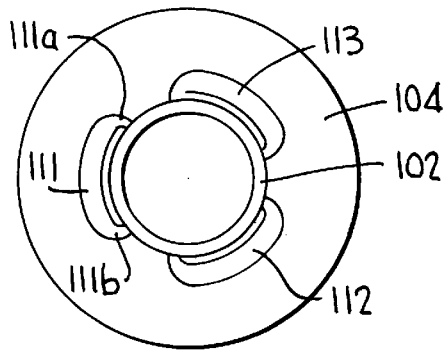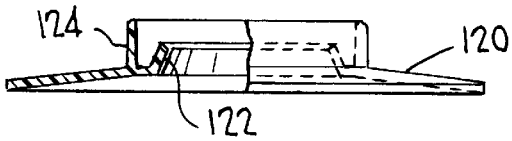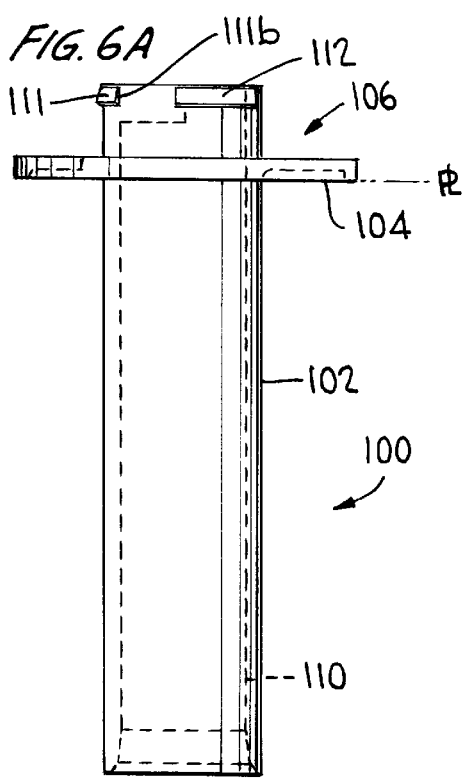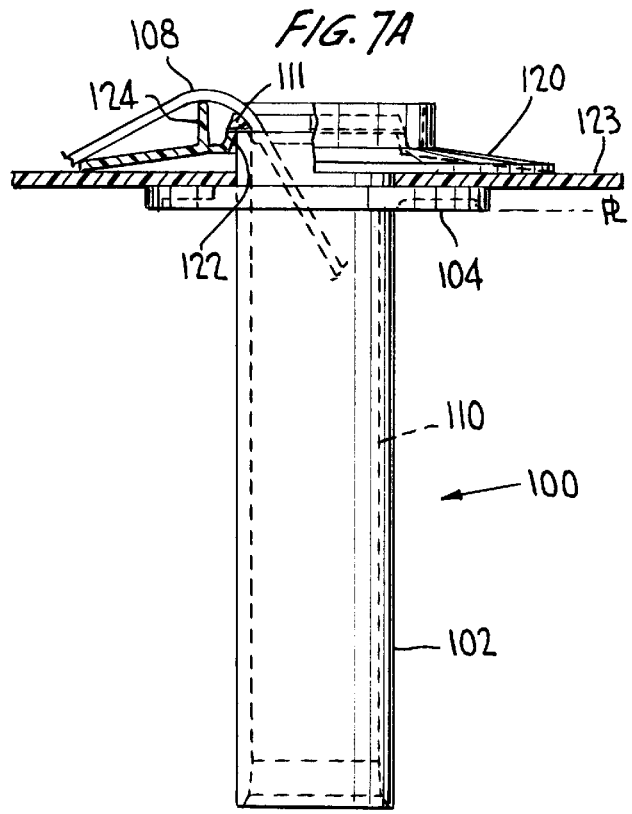

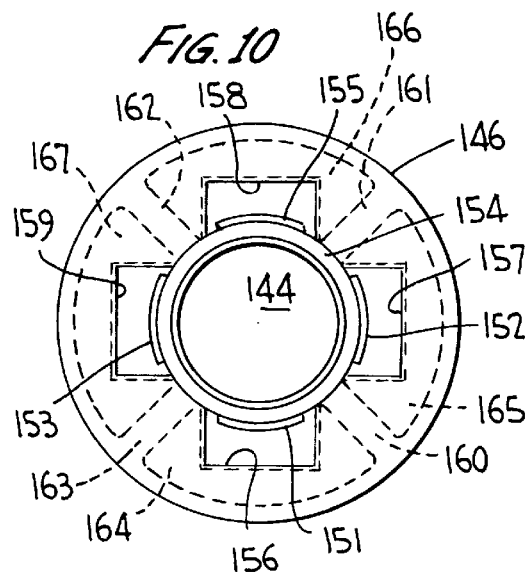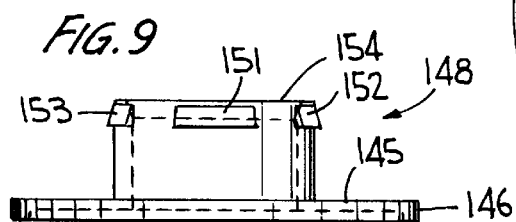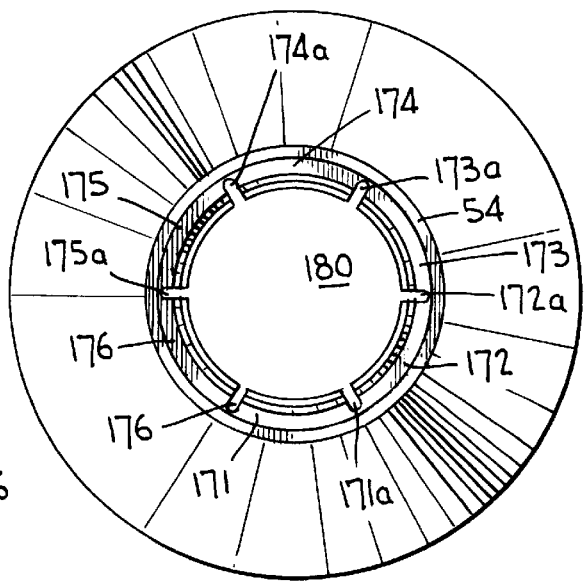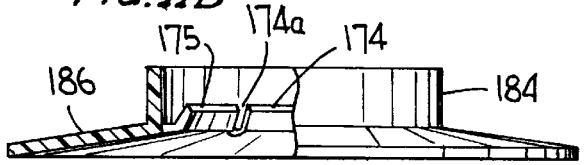

SNAP-ON TUBE AND LOCKING COLLAR FOR GUIDING FILAMENTARY MATERIAL THROUGH A WALL PANEL OF A CONTAINER CONTAINING WOUND FILAMENTARY MATERIAL

BACKGROUND OF THE INVENTION

1. Cross-Reference to Related Applications

This invention is derived from provisional application Ser. Nos. 60/014,390, filed 28 Mar. 1996, 60/017161, filed 10 Apr. 1996 AND 60/019,716, filed 6 Jun. 1996 by Messrs. Robert P. Wallace and Ronald E. Zajac.

2. Field of the Invention

This invention relates to payout devices attached to containers for dispensing strand-like or filamentary material from a wound coil in the container, and more particularly to such payout devices comprising a hollow feed tube guide (payout tube) inserted through a hole in the wall panel of the container and pushed into locking engagement with a locking collar so that the wall panel is retained between the locking collar and payout tube, whereby the strand-like or filamentary material can be withdrawn from the container through a central hole in the payout tube and the locking collar. The interlocking relationship between the locking collar and the payout tube is preferably permanent.

3. Related Art

U.S. Pat. No. 4,019,636 to Wise discloses a dispensing package for coiled stand-like material using inner and outer feed tubes engageable with the wall panel of a container for paying-out the coiled strand material.

U.S. Pat. No. 4,022,399 to Zajac is directed to a payout tube with respective flanges spaced substantially the same as the thickness of the wall panel and with the outer flange having an outwardly bent portion which rides up the wall of the opening in the container so that the tube can be turned to a position in which the principal part of the outer flange engages against the outside of the wall.

U.S. Pat. No. 4,057,204 to Zajac discloses a payout tube having a flange adjacent the outer end and two outwardly extending projections between the flange and the outer end with a space therebetween. The inner edges of the projections are slanted in opposite directions and the outer end of the tube is brought through an opening having diametrically opposed notches in the corrugated material such that, with 90 degrees rotation of the tube, the projections ride up the wall of the corrugated material and dig into it to prevent accidental turning of the tube.

U.S. Pat. No. 4,274,607 to Priest discloses a guide for elongated filamentary material which guide is secured by an outer end within an opening in a carton. Restraint means in the form of a plurality of finger barriers are provided within the guide member and cooperate with the elongated filament to prevent its reaction or withdrawal back into the container.

U.S. Pat. No. 4,373,687 to Zicko discloses a hollow feed tube frictionally engaged with an underlying closure flap of a container and interlockingly engaged with the die-cut closure flap of the container.

U.S. Pat. No. 5,368,245 to Fore discloses a two-piece elongated pay-out tube secured through an outlet opening of a cable box so that cable can be fed from within the box and through the pay-out tube. The tube includes an inner flange for abutting against the inside wall of the cable box. A locking collar is snapped into engagement with the inner flange from outside of the box, through the opening within the box, and into engagement with the inner flange resulting in a locking relationship between the inner flange and its associated elongated tube and the locking collar.

SUMMARY OF THE INVENTION

Notwithstanding the above developments in the design of payout tubes, there remains a need to provide a payout tube that is attachable to a wall panel of a container by simply pushing the tube through a hole in the container wall panel and into engagement with a locking collar, thereby obviating any rotating or twisting movement of the payout tube with respect to the locking collar.

Thus, a primary object of the invention is to provide a two-piece, push-on payout tube comprising the payout tube and locking collar which can be snap-fastened together on opposite sides of the wall of a container, remain in a permanent locked position and provide a smooth radius between the edge of the payout tube and the locking collar to prevent a sharp bend in the filamentary material being withdrawn from the container and through the payout tube.

A feature of the invention is that no alignment of the payout tube and locking collar is required as flexible finger members in the locking collar simply slide over projecting teeth or a projecting lip on the exposed end of the payout tube and the flexible fingers are retained and locked by the projection teeth or projection lip.

An advantage of the invention is that the payout tube and locking collar may be fastened to the wall of a container by simply pressing the payout tube and locking collar together.

Another object of the invention is to provide the combination of a payout tube and locking collar as described herein wherein the necessary force to join the payout tube and the locking collar may be applied during either manual or automated assembly of the combined payout tube and the locking collar.

Another feature of the invention is that the force required to snap the locking collar and the payout tube into locking engagement may be applied either manually or by automated means to a surface of the locking collar.

Yet another feature of the invention is that the force required to snap the locking collar and the payout tube into locking engagement may be varied by varying the quantity of flexible finger members contacting the projection lip either by reducing the actual number of finger members and/or providing spaces in the projection lip.

Another advantage of the combined payout tube and locking collar of the invention is that the payout tube and the locking collar may be easily snap-locked into a permanent engagement.

Yet another object of the invention is to provide a flexible locking collar for the purposes specified herein to accommodate various wall thicknesses of the containers containing the wound flexible material.

Yet another feature of the invention is that the locking of the payout tube and locking collar are independent of the thickness of the panel wall of the container.

A further feature of the invention is to provide a locking collar of the type specified herein having a tapered flange, thereby enabling the locking collar to flex to accommodate different wall thicknesses of container panels.

Still another advantage of the invention is that the flange of the locking collar may be designed to provide flexibility with respect to the different wall thicknesses of container to which the combined payout tube and locking collar may be employed.

A further object of the invention is to provide a payout tube and locking collar as specified herein wherein the payout tube and the locking collar may be molded from the same type of plastic material.

Yet another feature of the invention is that plastic material consisting of polyeurathane is suitable for both the payout tube and the locking collar.

Yet another advantage of the invention is that such plastic material is capable of being molded and when molded is durable enough for handling and being transported and to withstand the passage of the filamentary material through the central opening in the payout tube when attached to the wall panel of a container containing the wound coil.

BRIEF DESCRIPTION OF THE DRAWINGS

The above, features and advantages of the invention are believed to be readily apparent from the following description of a preferred embodiment representing the best mode of carrying out the invention when taken in conjunction with the following drawings, wherein:

FIG. 1A is a cross-section, side elevation view of the payout tube in accordance with the invention taken along line 1A—1A; and FIG. 1B is a full top view of the same payout tube showing the peripherally extending locking flange;

FIG. 2A is a side elevation view of the payout tube showing the locking flange; FIG. 2B is a top view of a section of the locking collar showing the flexible locking fingers spaced at ninety degree intervals around the periphery of the central entrance hole for the tube; and FIG. 2C is an elevational view of the locking collar of FIG. 2B;

FIG. 3A is a cross-section side view of the tube taken along line 3A—3A of FIG. 3B and showing the mating relationship of the wall panel of the container and the interlocking relationship of a pair of flexible locking fingers engaged with the under side of the locking flange; FIG. 3B is a top view of the locking collar; and FIG. 3C is a cross-section view of the locking collar taken along line 3A—3A in FIG. 3B;

FIGS. 4A and 4B represent a modified embodiment of the invention wherein FIG. 4A is a side elevation view of a payout tube with the upper portion thereof illustrating the engagement of a finger member of a locking collar with a projection lip of the payout tube; and FIG. 4B is a top view of the payout tube showing three segmented locking finger members of the locking collar shown in phantom;

FIGS. 5A, 5B and 5C illustrate yet another embodiment of the invention, wherein FIG. 5A is a side elevation view of the payout tube similar to FIG. 4A; FIG. 5B illustrates a bottom view of the payout tube showing a six segmented projection lip; and FIG. 5C is a cross-section view of the locking finger members;

FIG. 6A illustrates a side elevation view of a payout tube in accordance with the invention; FIG. 6B is a top view of the payout tube in accordance with the invention and showing three locking teeth for engaging the locking fingers on the locking collar; and FIG. 6C is a further top view of the combined payout tube and locking collar illustrating the construction of the locking flange thereon;

FIG. 7A illustrates the payout tube and the locking collar in locked engagement with filamentary material extending through the tube and over a raised wall member of the locking collar to form a minimum bend radius for the filamentary material; FIG. 7B is a cross-section view of the locking collar; and FIG. 7C is a top view of the locking collar showing four locking fingers thereon for engaging a corresponding number of locking teeth on a payout tube;

FIG. 8 is a detailed view of a portion of a modified locking collar of the invention and showing a raised wall for supporting the filamentary material to provide a minimum bend radius for the same; and also showing the under-surface of the locking collar flange, which is tapered toward the center of the locking collar to enable it to flex-up to accommodate different thicknesses of container wall panel;

FIG. 9 illustrates a side elevation view of a payout tube in accordance with the invention;

FIG. 10 is a top view of a modified embodiment of a payout tube in accordance with the invention employing four locking teeth for engaging six locking fingers on the locking collar;

FIG. 11A is a top view of the locking collar showing six locking fingers thereon for engaging the four locking teeth on the payout tube illustrated in FIG. 10; and FIG. 11B is a cross-section view of a further modified embodiment of a locking collar taken along line 11B—11B of FIG. 11A and showing the raised wall for supporting the filamentary material to provide a minimum bend radius for the same as it is fed from the payout tube; and also showing the under-surface of the locking collar flange, which is tapered toward the center of the locking collar to enable it to flex-up to accommodate different thicknesses of container wall panel.

DETAILED DESCRIPTION

With reference to FIGS. 1A and 1B, payout tube 10 comprises a cylindrical cylinder 12 having a circular flange 14 at an upper portion 16 of the payout tube, which flange abuts against the inner panel wall of a container (not shown) when the payout tube 10 is inserted into a hole in the panel wall. Opening 20 in payout tube 10 provides passage for the filamentary material (not shown). Indentations 22a, 22b and 22c, including projecting locking lip 24 provides part of the structure for retaining the locking collar (not shown in FIGS. 1A and 1B) in engaged relation with payout tube 10 as will be more fully described hereinafter.

The cross-section, side elevation view of the payout tube 10 (as shown in FIGS. 1A and 1B) includes cylinder 12, support flange 14, indentations 22A, 22b, 22c and 22d spaced at ninety degree intervals around wall 23 of payout tube 10; and projecting locking lip 24 illustrated in FIG. 1A. Locking collar 26 is shown in FIG. 2B and includes flange 27 for engaging the opposite side portion of the wall panel (not shown) than that of support flange 14 of payout tube 10. Locator projections 28, 30, 32 and 34 extend outwardly from the circular rib 36 and are spaced at ninety degree intervals to coincide with the interval spacing of indentations 22a, 22b, 22c and 22d of the payout tube 10. A pair of spaced finger members 38, 40, 42 and 44 respectively straddle locator projections 28, 30, 32 and 34 as illustrated in FIG. 2B. Spaced finger members 38, 40, 42 and 44 are flexible and provide the means for locking the locking collar 26 to the payout tube as is described with respect to FIG. 3A.

FIG. 3A illustrates the manner in which the container wall panel 46 is sandwiched between the support flange 14 of payout tube 10 and flange 27 of locking collar 26, whereby the locking collar 26 and the payout tube 10 are locked together by the bending of flexible fingers (flexible fingers 38 and 42 and associated indentations 22a and 22c being shown in FIG. 3A) under projecting locking lip 24 to retain flange 27 and support flange 14 in locking relationship. This bending of the flexible finger members is caused by locating flanges 28, 30, 32 and 34, respectively, in indentations 22d, 22a, 22b and 22c and pushing the locking collar 26 downwardly onto the payout tube 10. This causes the flexible finger members 38, 40, 42 and 44 to ride up and over projecting locking lip 24 with the end portions of the respective fingers being engaged under projecting locking lip 24 as shown in FIG. 3A to retain the locking collar 26 and the payout tube 10 in locking relationship with the wall panel 46 sandwiched between support flange 14 and flange 27.

A significant modification of the above-described embodiment of the invention, relates to the location of the flexible finger members to enable the locking collar to be pushed down onto the payout tube without the need to align the two components as described herein. Specifically, in the modified embodiment the flexible fingers extend substantially around the periphery of the locking collar 26 between wall 23 and circular flange 36. This modification also provides additional locking forces between the locking collar 26 and payout tube 10 because of the increased engagement between the number of finger members engaging the projecting locking lip 24.

The modified embodiment of FIGS. 4A and 4B illustrates a three-segmented finger member structure in which none of the finger members 50, 52 and 54 are in opposing relationship. Such a configuration increases the force necessary to separate the locking collar 56 from payout tube 10 as the spaced engagement between the finger members 50, 52 and 54 and the projecting retaining lip 58, 60 (only two projecting retaining lips being shown in FIG. 4A, an actual engagement of finger member 62 and projecting retaining lip 60 being shown in FIG. 4A) prevents the locking collar 56 and the payout tube 10 from wobbling with respect to one another.

FIGS. 5A–5C show a further embodiment of the invention in which there are six segmented finger members 64, 66, 68, 70, 72 and 74 as shown in FIG. 5B which represents a bottom view of the locking collar 63. FIG. 5C is a cross section view of FIG. 5B taken along line 5C—5C. Holes 76, 78, 80, 82, 84, 86, 88 and 90 are provided in locking collar 63 to increase the flexibility thereof to provide engagement with the wall panel of the container (not shown). Additional structure and operation of the finger members is more fully described hereinafter.

From the foregoing description it is apparent that a payout tube having projecting retaining lips may be positively attached to the wall member of a carton or container by pushing the payout tube onto a locking collar having flexible finger members which are engaged by the retaining lips. The force necessary to engage and disengage the payout tube and the flexible spring members may be varied simply by controlling the amount of contact between the flexible spring members and the retaining lips as well as the spacing and positioning of the flexible spring members and the retaining lips. Increasing the flexibility of the locking collar flange by forming holes in the flange increases the engagement between the locking flange and the wall member of the panel of the container, thereby increasing the locking engagement of the payout tube and locking collar with the container.

With reference to FIGS. 6A–6C, payout tube 100 comprises a cylinder 102 having a circular flange 104 at an upper portion 106 of the payout tube, which flange abuts against the inner panel wall of a container (not shown) when the payout tube 100 is inserted into a hole in the panel wall. Opening 110 in payout tube 100 provides passage for the filamentary material 108 (see FIG. 7A). Locking teeth 111, 112 provide part of the structure for retaining the locking collar (not shown in FIGS. 6A and 6B) in engaged relation with payout tube 100 as will be more fully described hereinafter. FIGS. 6B and 6C illustrate a representative third locking tooth 113 with locking teeth 111, 112 and 113 spaced at approximately 120 degree intervals around the periphery of payout tube 100. It is understood that four or more locking teeth may be located at substantially equal intervals around the periphery of payout tube 100. It is significant that each of locking teeth 111, 112 and 113 have curved radius end portions such as that represented by end portions 111a and 111b illustrated in FIG. 6B to reduce the force required to interlock teeth 111, 112 and 113 with the flexible fingers of the locking collar (to be described hereinafter).

FIG. 7A illustrates payout tube 100 interlocked with locking collar 120 by means of a flexible finger 122 engaging with a locking tooth 111 (actually locking teeth 111, 112 and 113, respectively, are engaged with respective locking fingers on the locking collar 120 (only one being shown in FIG. 7A) so that wall panel 123 of a container is sandwiched between circular flange 104 of payout tube 100 and locking collar 120. Support ring 124 extends above the surface of locking collar 120 to support the filamentary material as it exits from opening 110 in the payout tube 100, thereby providing a sufficient radius to prevent filamentary material 108 from kinking.

FIG. 7C illustrates four flexible fingers 125, 126, 127 and 128 with intervening slots 129, 130, 131 and 132 between the respective flexible fingers to reduce the installation force when the payout tube 100 and the locking collar 120 are pushed into engagement. Obviously the number of flexible fingers should match the number of locking teeth; however, four flexible fingers are illustrated in FIG. 7C merely to demonstrate that other than three flexible fingers and locking teeth may be employed in the invention.

In FIG. 8 the detailed view of locking collar 120 shows that the locking collar is tapered toward the raised wall 124 so that end portion 120a is thicker than inner portion 120b, thereby enabling the end portion 120a of locking collar 120 to flex upwardly to accommodate different thicknesses of container wall panel 123. Additionally, raised wall 124 extends around the periphery of the locking collar 120 (see FIGS. 7A and 7C) and extends slightly above locking tooth 111 (actually all of the locking teeth on the payout tube) to provide support and a minimum bending radius 132 for the filamentary material being withdrawn through hole 110 in the payout tube. This prevents the filamentary material from kinking as it is withdrawn from the payout tube.

With reference to FIG. 9, payout tube 140 comprises a cylinder 142 having an opening 144 extending throughout the length of the payout tube, and through which filamentary material (not shown) may be withdrawn from a wound coil of filamentary material in a container (also not shown) through a hole in a panel wall thereof and to which the payout tube is attached as will be more fully described hereinafter. A circular flange 146 is formed at an upper portion 148 of the payout tube 140, the upper surface 145 of the flange 146 abuts against the inner panel wall of a container (not shown) when the payout tube 140 is inserted into a hole in the panel wall so that upper portion 148 of the payout tube 140 extends outside the panel wall.

Locking teeth 151, 152, 153, formed around the periphery 154 of the upper portion 148 of the payout tube 140, provide part of the structure for retaining the locking collar (shown in FIG. 10) in engaged relation with flange 146 of payout tube 140 as will be more fully described hereinafter. As is clearly illustrated in FIG. 10, there are four locking teeth 151, 152, 153 and 155, spaced at approximately 90 degree intervals around the periphery 154 of payout tube 140. It is significant that each of locking teeth 151, 152, 153 and 155 have curved radius end portions 151a, 152a, 153a and 155a and 151b, 152b, 153b and 155b (as illustrated in FIG. 10) to reduce the force required to interlock teeth 151, 152, 153 and 155 with the flexible fingers of the locking collar (to be described hereinafter).

FIG. 10 illustrates a top view of payout tube 10 with locking teeth 151, 152, 153 and 155 respectively formed around the periphery 154 of payout tube 140. Rectangular-shaped cutouts 156, 157, 158 and 159 are formed in flange 146 in front of locking teeth 151, 152, 153 and 155 to provide flexibility to flange 146. Struts 160, 161, 162 and 163 are molded into flange 146 to provide support therefor. Cutout portions 164, 165, 166 and 167 on the underside of flange 146 also provide flexibility to flange 146 as well as reduce the bulk of the flange.

FIGS. 11A and 11B respectively illustrate a top view and cross-section view (along line 11B—11B of FIG. 11A) of locking collar 170 with six locking fingers 171, 172, 173, 174, 175 and 176, respectively separated by cutout portions 171a, 172a, 173a, 174a, 175a and 176a which provide flexibility for each of locking fingers 171, 172, 173, 174, 175 and 176. Lines 174b, 174c and 174d shown in representative flexible finger 174, only illustrate the gradient of the slope of the flexible finger and do not indicate a stepped slope. This condition is valid for all of the flexible fingers 171, 172, 173, 174, 175 and 176. The four locking teeth 151, 152, 153 and 155 of the payout tube are pressed into locking engagement with the six locking fingers 171, 172, 173, 174, 175 and 176 of the locking collar 170 with the panel wall of the container (not shown), as described above for other embodiments of the invention, sandwiched between the locking collar flange 186 and flange 146 of the payout tube 140. There is no need to align the four locking teeth of the payout tube 140 with any one of the flexible fingers 171, 172, 173, 174, 175 and 176. Indeed any attempt to align the four locking teeth and the flexible fingers would be impossible as there is not an equal number of locking teeth and flexible fingers. The inventors have demonstrated that the combination of four locking teeth and six flexible fingers is an optimum design from the standpoint of the ease (i.e. force required) of locking the payout tube 140 and the locking collar 170 together.

Support ring 184 extends above the surface of locking collar 170 to support filamentary material as it exits from opening 180 in the top portion 148 of payout tube 140, thereby providing a sufficient radius to prevent the filamentary material from kinking as it is removed from the payout tube 140.

Flange 186 of the locking collar 170 is sloped as indicated in FIG. 11B so that the flange will flex as it is pressed against the wall panel of a container to which the payout tube is attached for the purpose of unwinding the filamentary material from a winding contained in the container.

The payout tube and the locking collar described herein are molded entirely from poly-vinyl or other suitable material.

It is noted that in all of the embodiments of the invention described herein, it is desirable that the joining of the payout tube and the locking collar be substantially permanent so that the payout tube and the locking collar do not become separated during use. If necessary, it is possible to pry the payout tube and the locking collar apart using a screw driver or other such implement.

The above description serves only to describe exemplary embodiments of the best mode of making the invention to demonstrate the features and advantages of its construction and operation. The invention is not intended to be limited thereby, as those skilled in the payout tube art will readily perceive modifications of the above-described embodiments. Thus the invention is intended to be limited only by the following claims and the equivalents to which the components thereof are entitled.

What is claimed is:

1. A payout tube assembly for unwinding filamentary material from a wound coil of filamentary material contained in a container having a wall panel with a hole for mounting said push-on tube and locking collar on the container wall panel, comprising:

a hollow payout tube having an end portion extending through the hole, said end portion including a flange extending around the periphery of the tube and having a surface engaging the inner surface of the wall panel surrounding said hole, and further including at least three segmented locking protrusions extending around the periphery of said end portion and separated by spaces;

a locking collar for engaging the outer wall of said wall panel and including at least three segmented locking teeth spaced substantially around an inner perimeter of the locking collar for engaging with said segmented locking protrusions with pressure exerted on said locking collar to cause said payout tube and said locking collar to be locked together by increased locking forces produced by said at least three locking teeth.

2. A payout tube assembly according to claim 1, wherein each of said locking protrusions including curved radius end portions for reducing the force required to engage with said locking teeth.

3. A payout tube assembly according to claim 2, wherein said second flange further includes cut-out portions for decreasing the bulk and increasing the flexibility of said second flange.

4. A payout tube assembly according to claim 1, wherein said segmented locking protrusions comprising four segmented locking teeth equally spaced substantially around the perimeter of said flange; and said segmented locking teeth comprising four segmented groups of flexible fingers spaced substantially around an inner perimeter of said locking collar; and a respective one of said four segmented groups of flexible fingers engaging with a respective one of said four segmented locking teeth with pressure exerted on said locking collar to lock said payout tube and said locking collar together.

5. A payout tube assembly according to claim 4, wherein said locking collar further including an intervening slot between each of the four segmented groups of flexible fingers for reducing the force required to engage the payout tube and the locking collar.

6. A payout tube assembly according to claim 5 wherein said locking collar is tapered from a central portion thereof to the periphery thereof to enable the locking collar to flex to accommodate different thicknesses of container wall panel.

7. A payout tube according to claim 6, wherein said locking collar further comprises a support ring extending substantially around the collar adjacent the periphery of the payout tube to support flexible material passing through the payout tube to prevent kinking of the flexible material.

8. A payout tube assembly according to claim 1, wherein said plurality of spaced, segmented locking protrusions comprising four segmented locking teeth equally spaced substantially around the perimeter of said flange to be in opposing relationship to one another, and said payout tube further comprising a rectangular-shaped cut-out formed in a region of said flange adjacent each of said four segmented locking teeth for increasing the flexibility of said flange; and said plurality of segmented flexible fingers comprising six segmented groups of flexible fingers equally spaced substantially around an inner perimeter of said locking collar; said six groups of flexible fingers are in opposing relationship to one another for engaging with said four segmented locking teeth with reduced pressure exerted on said locking collar to cause said payout tube and said locking collar to be locked together.

9. A payout tube assembly according to claim 8, wherein said four segmented locking teeth each include curved end portions for reducing the force required to engage said payout tube and said locking collar.

10. A payout tube assemble according to claim 9, wherein said flange further includes molded struts between each of said four locking teeth to provide support for said flange and further including cut-out portions on the underside of said flange adjacent each of said four locking teeth to reduce the bulk and increase the flexibility of said flange.

11. A payout tube assembly according to claim 10, wherein said flange further includes rectangular cut-out portions in a region of said flange adjacent each of said four segmented locking teeth for increasing the flexibility of said flange.

12. A payout tube assembly according to claim 11, wherein said locking collar further includes an upstanding support ring for supporting the flexible material emerging from said payout tube and preventing the flexible material from kinking.

13. A payout tube assembly according to claim 12, wherein said locking collar is tapered radially to increase the flexibility of the locking collar.

14. A payout tube assemble according to claim 8, wherein said flange further includes molded struts between each of said four locking teeth to provide support for said flange and further including cut-out portions on the underside of said flange adjacent each of said four locking teeth to reduce the bulk and increase the flexibility of said flange.

15. A payout tube assembly according to claim 8, wherein said flange further includes rectangular cut-out portions in a region of said flange adjacent each of said four segmented locking teeth for increasing the flexibility of said flange.

16. A payout tube assembly according to claim 8, wherein said locking collar further includes an upstanding support ring for supporting the flexible material emerging from said payout tube and preventing the flexible material from kinking.

17. A payout tube assembly according to claim 8, wherein said locking collar is tapered radially to increase the flexibility of the locking collar.

* * * * *

UNITED STATES PATENT AND TRADEMARK OFFICE
CERTIFICATE OF CORRECTION

PATENT NO. : 5,810,272
DATED : September 22, 1998
INVENTOR(S) : Robert P. Wallace et al.

It is certified that error appears in the above-identified patent and that said Letters Patent is hereby corrected as shown below:

On the title page, item [75] and [73] should read as follows:

Inventors: Robert P. Wallace, Amawalk; Ronald E, Zajac, Hopewell Junction, both of N.Y.

Assignee: Windings, Inc., Patterson, N.Y.

Signed and Sealed this

Twelfth Day of January, 1999

Attest:

Attesting Officer    *Acting Commissioner of Patents and Trademarks*